United States Patent [19]

Bauer

[11] 4,060,165
[45] Nov. 29, 1977

[54] DIVERTER FOR DISTRIBUTING ARTICLES SUPPLIED IN ONE LINE AMONGST A PLURALITY OF CONVEYING TRACKS

[76] Inventor: Everhard Bauer, Hudeweg 2, 479 Padervorn, Germany

[21] Appl. No.: 685,256

[22] Filed: May 11, 1976

[30] Foreign Application Priority Data

May 12, 1975 Germany .............................. 2521054
June 6, 1975 Germany .............................. 2525356

[51] Int. Cl.² ............................................ B65G 47/26
[52] U.S. Cl. ................................. 198/442; 198/367; 198/441
[58] Field of Search .......... 198/31 R, 31 AA, 31 AB, 198/31 AC, 367, 437, 441, 442

[56] References Cited

U.S. PATENT DOCUMENTS

| 1,284,637 | 11/1918 | Foss ................................. 198/31 AA |
| 1,647,280 | 11/1927 | Ianui ................................ 198/31 AC |
| 2,455,741 | 12/1948 | Dodge ............................. 198/31 AC |
| 3,193,078 | 7/1965 | Amenta et al. .................. 198/31 AC |
| 3,326,349 | 6/1967 | Pettis et al. ...................... 198/31 AC |
| 3,811,555 | 5/1974 | Scheier et al. ................... 198/31 AC |
| 3,822,006 | 7/1974 | Shuttleworth ................... 198/31 AC |

FOREIGN PATENT DOCUMENTS

| 2,358,771 | 5/1975 | Germany ......................... 198/31 AC |
| J8,015 | 12/1956 | Germany ......................... 198/31 AC |

Primary Examiner—Evon C. Blunk
Assistant Examiner—Richard K. Thomson
Attorney, Agent, or Firm—Fleit & Jacobson

[57] ABSTRACT

An apparatus for distributing articles supplied in one line amongst a plurality of conveying tracks comprises guides pivotable about a vertical axis and defining a pivotable passage for said articles. A starwheel which is rotatable about a vertical axis is mounted on one of the guides and has its teeth successively projecting into the passage so that the starwheel is advanced by one tooth by the articles passing through said passage. A steering member is pivoted by one end to a crank driven by the starwheel, the other end being pivotable about a vertical axis so that an outlet end of said pivotable passage swings between said conveying tracks upon rotation of said starwheel. The starwheel is operatively connected to said crank by way of gearing.

9 Claims, 9 Drawing Figures

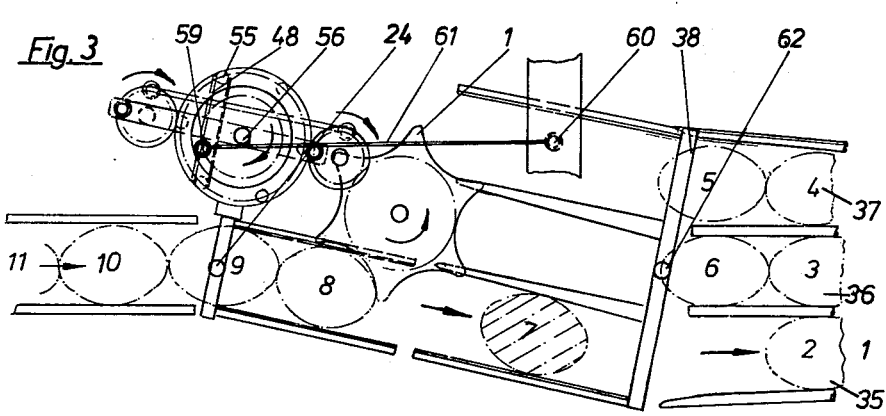
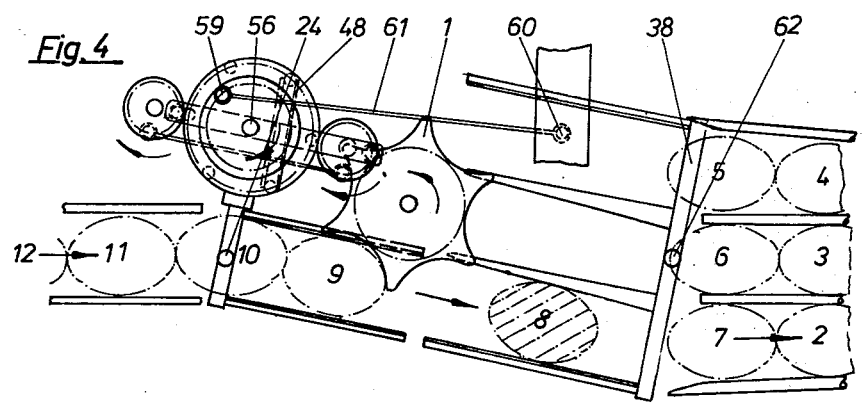
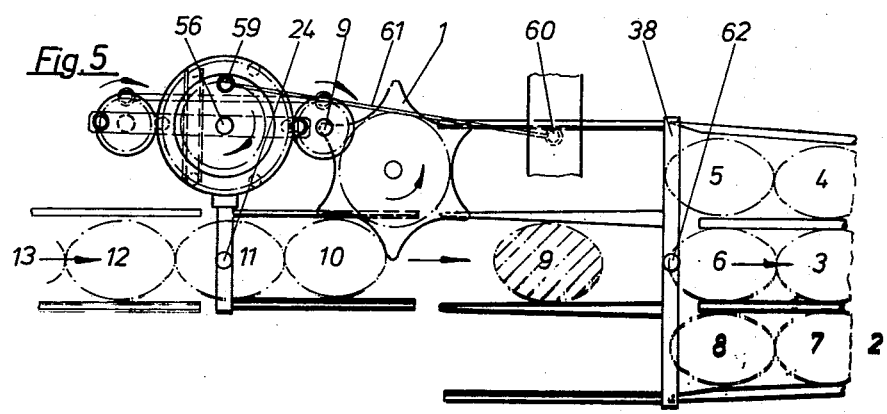

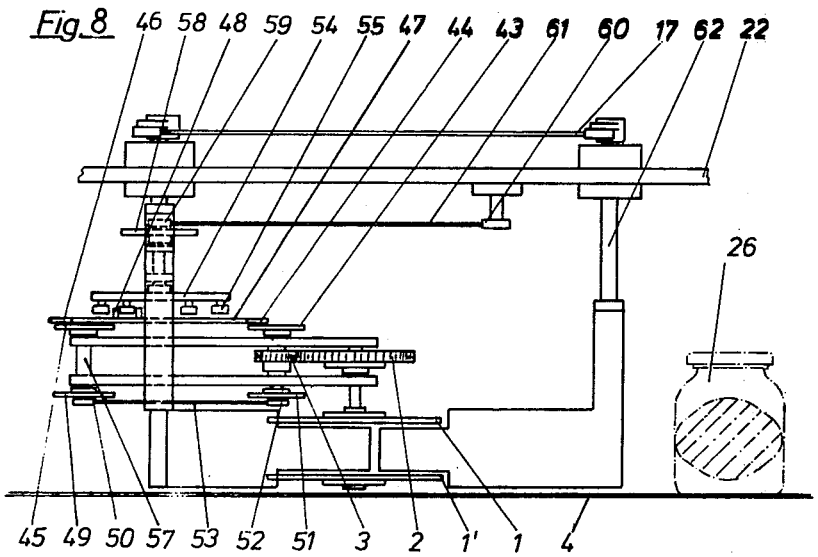
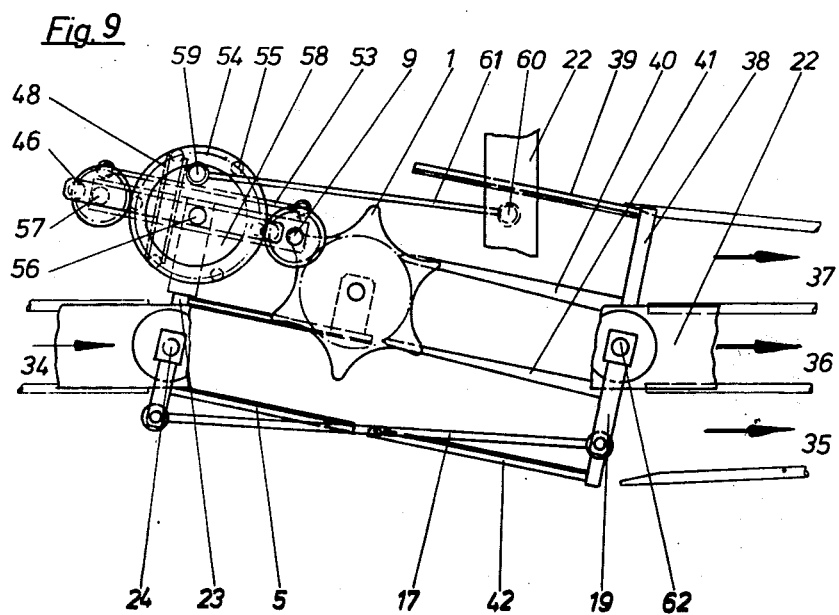

DIVERTER FOR DISTRIBUTING ARTICLES SUPPLIED IN ONE LINE AMONGST A PLURALITY OF CONVEYING TRACKS

The invention relates to an apparatus for distributing articles supplied in one line amongst a plurality of conveying tracks, comprising lateral guides bounding a passage for the articles to be distributed, which guides are pivotable about a vertical axis disposed in their inlet region, a switching gear which is rotatable about a vertical axis, is mounted on one of the lateral guides, projects into the pivotable passage formed by the guides and is advanced by one tooth by the passing articles, and a steering member which is pivotably mounted on a crank driven by the switching gear, the other end of the steering member being pivotable about a stationary vertical axis so that the free end of the passage formed by the guides swings between the conveying tracks upon rotation of the switching gear.

In an apparatus of this kind suggested by the Applicants in German Specification No. 2,358,771, which has proved successful as a high duty distributor, the steering member for pivoting the passage is rotatably mounted on the switching gear itself, the vertical rotary axis of the steering member extending eccentrically to the rotary axis of the switching gear for the purpose of forming a crank drive. The switching gear is thus itself a part of the crank which is driven by the articles passing through the passage. The articles to be distributed can be guided through the distributing apparatus in any desired manner on a support, preferably a conveyor belt, it merely being necessary to ensure that they are displaceable on the support transversely to the conveying direction for distribution amongst the two conveying tracks. In the apparatus according to the parent patent, the pivotable channel formed by the passage is swung to and fro once during each rotation of the switching gear or starwheel so that each of the two conveying tracks has $z/2$ articles apportioned to it, where $z$ is the number of teeth on the starwheel.

Although the above-described distributing apparatus permits articles to be distributed at a high throughput, it is desirable to increase the output and distributing speed still further so as to adapt it to high-performance filling, closing and labelling machines disposed upstream thereof. The object of the present invention is threfore to provide a distributing apparatus having a high throughput and with which particularly articles of any desired shape and any desired cross-section can be distributed without difficulty amongst a plurality of conveying tracks.

This object is achieved by the invention in an apparatus of the aforementioned kind in that the switching gear drives the crank through gearing. In the apparatus according to the invention, the interpositioning of gearing causes the pivotable channel to be pivoted between the conveying tracks in such a way upon passage of each article, that each conveying track has the same number of articles individually apportioned to it in a constant sequence.

To distribute the supplied articles amongst two conveying tracks, the transmission ratio between the switching gear and crank amounts to $1:z/2$, where $z$ is the number of teeth on the switching gear. By means of this construction of the apparatus according to the invention, the pivotable channel is pivoted from one conveying track to the other upon passage of each article so that the latter, immediately after leaving the pivotable channel, arrives in the respective conveying track bounded by guides. Tilting or jamming of articles of non-circular cross-section is thereby effectively avoided so that articles particularly with oval, angular oval and rhomboidal cross-section can be well distributed from one line amongst two lines. With the apparatus according to the invention it has already been possible to distribute over 400 glasses per minute from one line amongst two lines, this having been hitherto impossible with known distributing apparatuses.

Preferably, a gear in mesh with a gear driving the crank is fixed to the switching gear or on the switching gear shaft.

In the above-described apparatus, the articles supplied in one line are distributed amongst two conveying tracks by the pivotable passage. However, it is often necessary or desirable to distribute the articles amongst three lines to combine the articles to form larger packaging units. For this purpose the applicants have already suggested in their prior Application P 2,436,151.1 to provide the crank that pivots the passage by way of the steering member with a control which advances the crank 120° at a time, the diameter of the crank circle, the length of the steering member and the arrangement of the crank then being so chosen that a positionally correct pivotal motion of the passage takes place in relation to the three conveying tracks. It is decidedly problematic to provide a control for the crank that faultlessly switches the passage even at a high distributing speeds and avoids clamping and tilting of the articles to be distributed.

To solve this problem by way of a development of the invention, provision is made in an apparatus of the aforementioned kind that for distributing the supplied articles amongst three conveying tracks the switching gear is operatively connected with a transmission ratio of $1:z/2$ to the shaft of a second crank which drives a third crank through a crank rod for parallel guiding thereof, that a slotted member is fixed transversely on the crank rod, six slide blocks distributed at equal intervals over the periphery of a plate entering said slotted member to drive said plate through one sixth of a turn upon movement of the slotted member between its end positions, and that the plate drives at the same rotary speed the crank which swings the passage. This inventive development of the apparatus not only has the advantage that the articles passing through the passage are additionally guided by the switching gear but also the drive controlling swinging of the passage is additionally derived from the passing articles themselves, this leading to a simple and operatively reliable construction.

An increase in the speed through the distributing apparatus of the articles being distributed is often not possible because higher speeds lead to excessive impacts by which the articles can be destroyed, especially if they consist of glass, and which also lead to excessive loads on the distributing apparatus itself. In the previously described first embodiment of the present invention, accelerations and impact loads impairing the distribution are effectively avoided by swinging the passage by means of a crank drive. The crank drive delays pivotal movement of the passage towards its end positions according to a sine function up to standstill, which makes dsitribution of the articles possible almost without impact and thereby facilitates a considerable increase in the distributing speed.

The advantages of the sinusoidal drive are also achieved by index gearing when distributing amongst three conveying tracks according to the invention. Since the plate driving the crank is turned through one sixth of a turn by the slotted member fixed to the crank rod for each to and fro movement of the crank rod, pivoting of the passage is likewise sinusoidal because the rotary drive of the crank effecting swinging of the passage is likewise produced by a crank drive, one swinging movement of the crank rod between its end positions corresonding to rotation through 180° of the cranks driving same.

The plate driving the crank effecting swinging motion executes an irregular sinusoidal rotational movement of which the mean rotary speed corresponds to that of the switching gear. The indexing gearing thus serves sinusoidally to convert the rotary motion imparted to the switching gear by the passing articles.

The crank operatively connected to the sinusoidally irregularly driven plate can be formed in that a bearing pin for the steering member is eccentrically mounted thereon.

To avoid dead positions of the crank rod, the shafts of the second and third cranks preferably carry, at their ends facing same, further cranks with offset crank angles being hingedly interconected by a further crank rod.

To ensure good guiding of the articles to be distributed in the distributing apparatus, distributing tongues are preferably provided which, for the apparatus according to the invention for distributing articles from three tracks, should be so constructed that tongues bounding the inlet of the conveying tracks are provided, which tongues are secured to a common beam near their ends, and that the beam is pivotably mounted on the centre line of the central conveying track in the inlet region thereof and is so connected to the pivot shaft of the passage by way of levers and a steering member, that the tongues facing same are pivotable with a phase displacement of 180° with respect thereto.

In the apparatus according to the invention for distributing the articles amongst two conveying tracks, a distributing tongue can be provided with particular advantage.

The switching gear or starwheel may be provided with any number of teeth, six teeth having been found desirable. Further, the transmission ratio between the switching gear and crank in the apparatus for distributing amongst two conveying tracks and between the switching gear and the crank driving the crank rod in the apparatus for distributing amongst three conveying tracks can be selected at will to suit the desired distribution.

The switching gears are preferably readily replaceable in the apparatus so that the tooth forms can be readily adapted to the contours of the articles to be distributed simply by replacing the switching gears.

Examples of the invention will now be described with reference to the drawing, wherein:

FIG. 3 is a diagrammatic plan view of the distributing apparatus for distributing articles amongst three conveying tracks in a position feeding the right-hand conveying track;

FIGS. 4 to 7 show the successive distributing positions following that of FIG. 3 during a distributing cycle;

FIG. 8 is a side elevation of the FIG. 3 distributing apparatus, and

FIG. 9 is a further plan view of the apparatus according to FIGS. 3 to 8.

Figure 1:
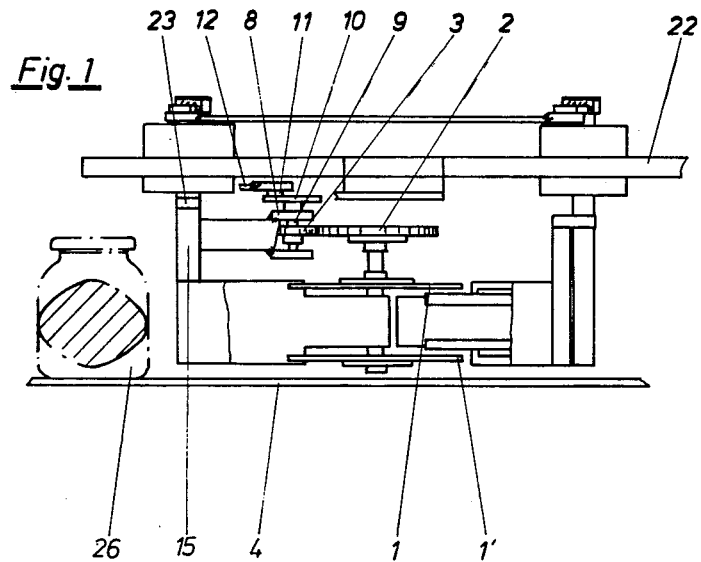
FIG. 1 is a diagrammatic side elevation of the distributing apparatus for distributing articles amongst two conveying tracks.

The distributing apparatus shown in FIS. 1 and 2 is fixed above the conveyor belt 4 to a beam 22 fixed with respect to the machine. The lateral guides 5, 5' forming the pivotable passage or pivotable channel are interconnected at their inlet side by a transverse yoke 23 having the bearing pin 24 at its centre. The pivotable channel is mounted by means of this bearing pin in the beam 22 fixed with respect to the machine. To secure the guides 5, 5' to the transverse yoke 23, vertically extending beams 15 are provided.

On the outside of the guide 5 there are secured bearings 6 in which the switching starwheel shaft 7 is mounted by way of roller bearings, the two switching starwheels 1, 1' being secured at a spacing from one another on said shaft. With their teeth 25, the switching stars 1, 1' project through gaps in the guides 5 into the passage formed between the guides 5, 5'. Secured to the switching star shaft 7 there is the pinion 2 which is in mesh with the gear 3 driving the crank 10, 11. The shaft 9 of the gear 3 is mounted by way of roller bearings in the bearing 8 which is likewise connected to the guide 5. At the upper free end of the bearing shaft 9 there is secured a plate 10 on which there is the eccentric bearing pin 11. Mounted on this bearing pin 11 by way of roller bearings there is the connecting rod 12 of which the other end is mounted by way of roller bearings in the hinge 13 of the beam 14 fixed with respect to the machine. The transmission ratio between the gears 2 and 3 amounts to 1:3, the switching gear 1 being provided with six teeth 25. For one rotation of the switching gear 1 and the pinion 2, the crank 10, 11 therefore turns three times so that the articles 26 to be distributed are alternately distributed amongst the conveying tracks 27, 28.

The pivotable tongue 21 separating the conveying tracks 27, 28 is secured to the shaft 20 which is likewise rotatably mounted in the beam 22 fixed with respect to the machine. On the shaft 20 a screw clamp connection 29 secures the lever 19, to the free end of which a link 17 is hinged. The other end of the line 17 is pivotably mounted on the lever 16 which is secured by a screw clamp connection 30 to the pivotal shaft of the pivotable channel 5, 5'.

The front end of the distributing tongue 21 as well as the inlet formed by the guides 31 and 32 for the conveying tracks 27, 28 is very close to the pivotable channel 5, 5' so that the articles to be distributed have to pass through substantially no section of the distributing diverter without being guided, whereby the distributing speed can be increased further. Good distribution is also improved in that the switching gear 1 is disposed in the rear region of the pivotable channel 5, 5' so that it passes through apertures in the distributing tongue 21 as well as the guides 31, 32.

The guides are provided with friction-reducing coverings 33, 33'.

Over 400 oval glasses 26 per minute can be distributed amongst the two conveying tracks 27, 28 by means of the illustrated apparatus.

Figure 2:
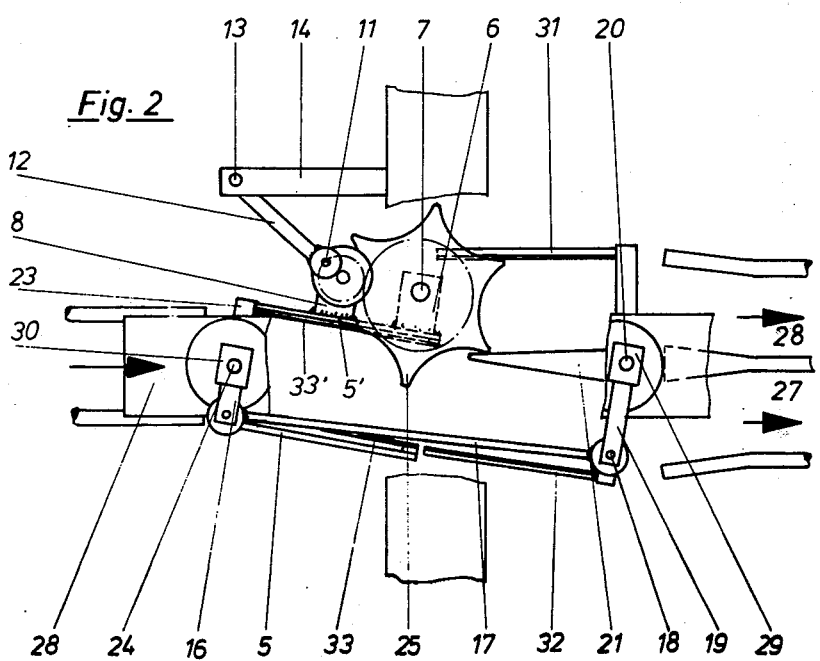
FIG. 2 is a plan view of the FIG. 1 distributing apparatus.

The distributing apparatus shown in FIGS. 3 to 9 for distributing articles supplied on the conveyor 34 amongst the conveying tracks 35, 36, 37 comprises the same pivotable channel with lateral guides 5, bearing pin 24 and switching gear 1 as that described for FIGS. 1 and 2 apparatus. Fixed to the switching star shaft 7 there is a gear 2 which meshes with the gear 3 and drives same. The gear 3 is secured on the bearing shaft 9 in the central region thereof, the bearing shaft being mounted by way of roller bearings in a beam secured to the pivotable channel. The bearing shaft 9 projects at both sides beyond its bearings, plates 43 and 51 being secured to its free ends. Each plate 43, 51 carries a crank pin 44, 52 which is eccentrically disposed on the plates 51, 43. At a spacing from the shaft 9, a further shaft 57 is mounted in the beams connected to the pivotable channel, the free ends of said further shaft having secured thereto corresponding plates 45 and 49 which are likewise provided with eccentrically disposed crank pins 46, 50. The beams receiving the bearings for the shafts 9 and 57 are formed by two spaced bearing beams which are secured to the pivotable channel.

The crank pins 44 and 46 are interconnected by way of roller bearings by the crank rod 47. Similarly, the crank pins 50 and 52 are interconnected by way of roller bearings by the crank rod 53. The crank rod 53 with the crank pins 50 and 52 hinged thereto serves as a countercrank so as to move the upper crank rod 47 safely through the dead positions of the crank. For this purpose, the crank pins 50 and 52 are displaced with respect to the crank pins 40 and 46 by a crank angle of 90°.

Centrally between the shafts 9 and 57, the shaft 56 is mounted on a beam projecting from the pivotable channel; the index plate 54 is secured to this beam above the plates 43, 45; six indexing rollers are uniformly distributed at 60° to one another over the periphery of the index plate at the underside thereof.

Secured at right-angles to the crank rod 47 at the center there is a slotted member 48 in which the indexing rollers 55 engage upon displacement of the crank rod 47 and drive the index plate 54 with a sinusoidally irregular motion. The diameter of the crank circles described by the crank pin 44 and 46, i.e. the length of the longitudinal displacement of the crank rod 47 from one extreme position to the other, corresponds to the radius of the circle on which the indexing rollers 55 are arranged on the index plate 54. Since the switching gear 1 is provided with six teeth, and the transmission ratio between the gears 2 and 3 amounts to 1:3, the crank pins 44, 46 are turned through a crank angle of 180° upon rotation of the switching gear 1 by one tooth, so that the slotted member 48 transmits a one sixth sinusoidal irregular rotation to the index plate 54 by way of the indexing roller 55.

At the upper end of the bearing shaft 56 there is secured a plate 58 on which a crank pin 59 is eccentrically mounted. Mounted on this crank pin by way of roller bearings there is the steering member 61 which is mounted at its other end at the hinge pin 60 by way of roller bearings. The hinge pin 60 is disposed on the beam 22 fixed with respect to the frame.

The spacings of the shaft 56 from the bearing pin 24 as well as of the bearing pin 59 from the shaft 56 and the length of the steering member 61 are such that for one revolution of the crank pin 59 the pivotable channel is swung once to and fro between the conveying tracks 35, 36, 37. The phase position of the pivotal motion will hereinafter be described in more detail.

In the inlet region of the conveying tracks 35, 36, 37, separating tongues 40, 41 and lateral guides 39, 42 are secured to a supporting beam 38 which is provided with a central bearing shaft 62 which is pivotably mounted in the beam 22. The tongues 40, 41 and lateral guides 39, 42 are controlled by the bearing shaft 24 by way of the bearing shaft 62, the steering member 17 and the levers 19 and 16 in such a way that they are pivoted at a phase displacement of 180° with respect to the pivotable channel 5.

The sequence of movements and the distribution of the articles supplied on the conveyor 34 amongst the conveying tracks 35, 36, 37 will now be explained with reference to FIGS. 3 to 7.

The articles to be distributed are referenced by the numerals 1 to 13. On passage of one of the articles to be distributed, for example the article 8 in FIG. 3, through the pivotable channel 5, the switching star 1 is advanced by one of its six teeth, i.e. by one sixth of a turn. By reason of the transmission of 1:3 between gears 2 and 3, the bearing shaft 9 executes half a turn as already described, this corresponding to an angle of rotation of the crank 44 of 180°. During this rotation, the crank rod 47 and the slotted member 48 secured thereto is brought by way of the plate 43 and the crank pin 44 eccentrically secured thereto from the FIG. 3 position to that shown in FIG. 4, i.e. the slotted member executes a stroke along a semi-circular path of movement. During this time, the slotted member 48 engages the indexing roller 45 and advances same through 60°, i.e. the bearing shaft 56 is advanced through 60° with a sinusoidal course of movement. Since the plate 58 is fixed to the bearing shaft 56, the crank pin 59 is also brought out of the FIG. 3 position through a crank angle of 60° to the position shown in FIG. 4. Since the pivotable channel is connected by the steering member 61 to the fixed point 60, the crank pin 59 controls the pivotal motion of the pivotable channel. In the FIG. 3 position of the pivotable channel, the latter is in registry with the pivotable inlet defined by the tongue 41 and the guide 42 for the conveying track 35, the crank pin being disposed below the line joining the shafts 9 and 57. During passage of the article 8 through the pivotable channel, the crank pin is on further motion moved through 60° about the culmination point of the steering member shaft 61 so that the pivotable channel executes a slight pendulating motion; the pivotable channel is not, however, switched to the inlet formed by the tongues 40, 41. In this position shown in FIG. 4, the crank pin 59 has moved above the line joining the shafts 9 and 57 by an amount equal to that by which is was below the line in FIG. 3. The article 8 therefore enters the righ-hand conveying track 35, as did the preceding article 7.

Upon further switching of the starwheel 1 by the article 9, the crank pin 59 is again advanced through 60°, so that the pivotable channel is switched in the manner shown in FIG. 5 to its central position at which it is in registry with the conveying track 36.

Figure 6:
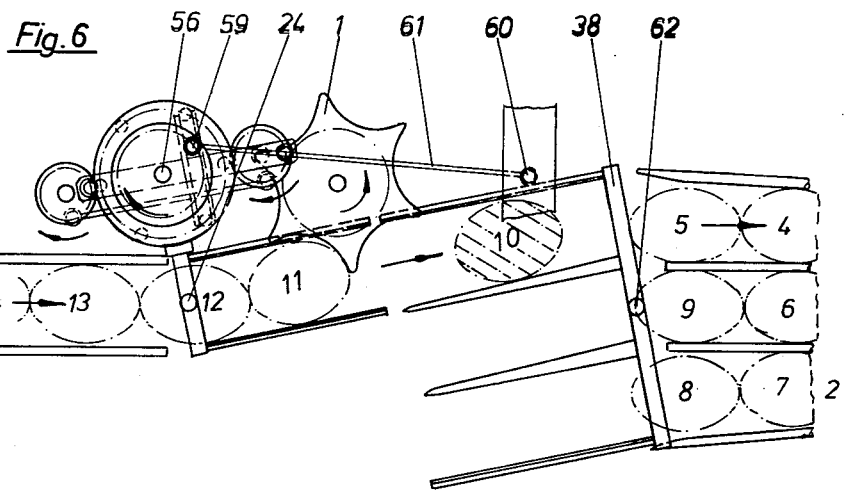

The article 10 turns the starwheel further and the crank pin 59 moves from the FIG. 5 position to that shown in FIG. 6 in which the pivotable channel has moved from its central position to its left-hand extreme position in which it is in registry with the inlet to the conveying track 37 as formed by the tongue 40 and the guide 39.

Figure 7:
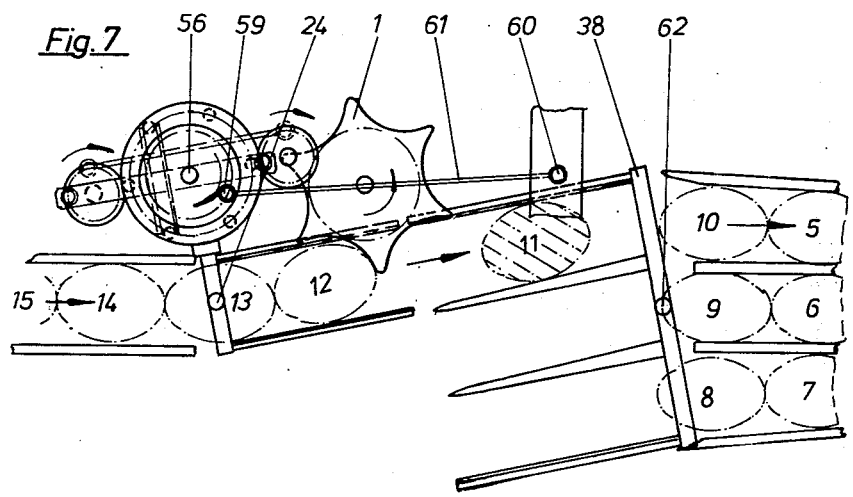

The article 11 moves the crank pin 59 from its FIG. 6 position to that shown in FIG. 7, the inner culmination point being traversed so that no pivotal motion of the pivotable channel takes place and the article 11 enters the same conveying track as did the article 10.

By reason of the fact that the outer conveying tracks each have two articles apportioned to it and the inner conveying track has one article apportioned to it during each to and fro swinging motion, there is a uniform distribution of the articles amongst the three conveying tracks.

I claim:

1. Apparatus for distributing articles supplied in one line to a plurality of conveying tracks, comprising lateral guides which bound a passage for the articles to be distributed, said guides being pivotable about a vertical axis disposed at the inlet region of the guides, a starwheel rotatable about a vertical axis mounted on one lateral guide and arranged to project into the pivotable passage formed by the guides so that it is stepped by one tooth by each of the articles passing through, wherein said starwheel is connected to gear means that drive a crank on which there is mounted a pivotable steering member of which the other end is pivotably mounted about a stationary vertical axis so that the free end of the passage formed by the guides swings between the conveying tracks upon rotation of the starwheel.

2. Apparatus according to claim 1, characterised in that for distributing the supplied articles (26) amongst two conveying tracks (27, 28), the transmission ratio between a switching gear (2) in the gear means and crank (10, 11) amounts to 1:z/2, where z is the number of teeth on the starwheel.

3. Apparatus according to claim 2, characterised in that the gear (2) is in mesh with a second gear (3) adapted to drive the crank (10, 11), the gear (2) being fixed to the starwheel (1) or on shaft (7) carrying the starwheel.

4. Apparatus according to claim 1 for distributing the supplied articles to three conveying tracks (35, 36, 37) wherein the starwheel (1) is operatively connected with a transmission ratio of 1:z/2 to the shaft (9) of a second crank (43, 44) which drives a third crank (45, 46) through a crank rod (47) for parallel guiding thereof, where z is the number of teeth on the starwheel and having a slotted member (48) fixed transversely on the crank rod (47), and having six slide blocks (55) distributed at equal intervals over the periphery of a plate (54) being arranged for entering said slotted member to drive said plate through one-sixth of a turn upon movement of the slotted member between its end positions, such that the plate (54) is driven at the same rotary speed as the crank (58, 59) which swings the passage (5).

5. Apparatus according to claim 4, characterised in that the shafts (9, 57) of the second and third cranks carry, at their ends facing said cranks, further cranks (51, 52; 49, 50) with offset crank angles and that these cranks are hingedly interconnected by a further crank rod (53).

6. Apparatus according to claim 4, characterised in that tongues (40, 41) bounding the inlet of the conveying tracks (35, 36, 37) are provided, which tongues are secured to a common beam (38) near their ends, and that the beam (38) is pivotably mounted on the centre line of the central conveying track (36) in the inlet region thereof and is so connected to the pivot shaft (24) of the passage (5) by way of levers (16, 19) and a steering member (17), that the tongues (40, 41) facing same are pivotable with a phase displacement of 180° with respect thereto.

7. Appartus according to claim 4, characterised in that the cranks are formed by plates having eccentric bearing pins and fixed to the crank shafts.

8. Apparatus according to claim 3, characterised in that the crank is formed by the eccentric arrangement of a bearing pin (11) on the second gear.

9. An apparatus for conveying and distributing articles comprising:
   1. first conveying means for conveying articles to be distributed;
   2. a plurality of second conveying means for receiving distributed articles; and
   3. distribution means operatively arranged to receive articles from said first conveying means and to distribute the articles to the said plurality of second conveying means, said distribution means comprising:
      a. a pair of guide members;
      b. a frame interconnecting the guide members to define a conveying and distributing passage for guiding articles through said distribution means in a single line;
      c. mounting means pivotally mounting said guide members and interconnecting frame so that the inlet of said conveying and distributing passage is aligned to receive articles from said first conveying means and the outlet of said conveying and distributing passage swings to align sequentially with the entrances to said plurality of second conveying means;
      d. a starwheel rotatably mounted in a fixed relationship with said guide members and having a portion thereof extending into said conveying and distributing passage in the path of articles passing along said conveying and distributing passage such that the starwheel is advanced one tooth by the movement of an article past the starwheel along the conveying and distributing passage;
      e. a first gear member operatively associated with said starwheel to rotate in response to rotation of said starwheel;
      f. a second gear member in meshing engagement with and driven by said first gear member;
      g. a steering member pivotally connected at one end to rotate about a fixed axis and connected at its other end eccentrically to said second gear member so that after a predetermined rotation of said second gear member in response to a predetermined number of articles having moved past the starwheel along the conveying and distributing passage, the guide members and interconnecting frame are pivoted to swing same into alignment with the entrance of a different one of said plurality of second conveying means.

* * * * *